UNITED STATES PATENT OFFICE.

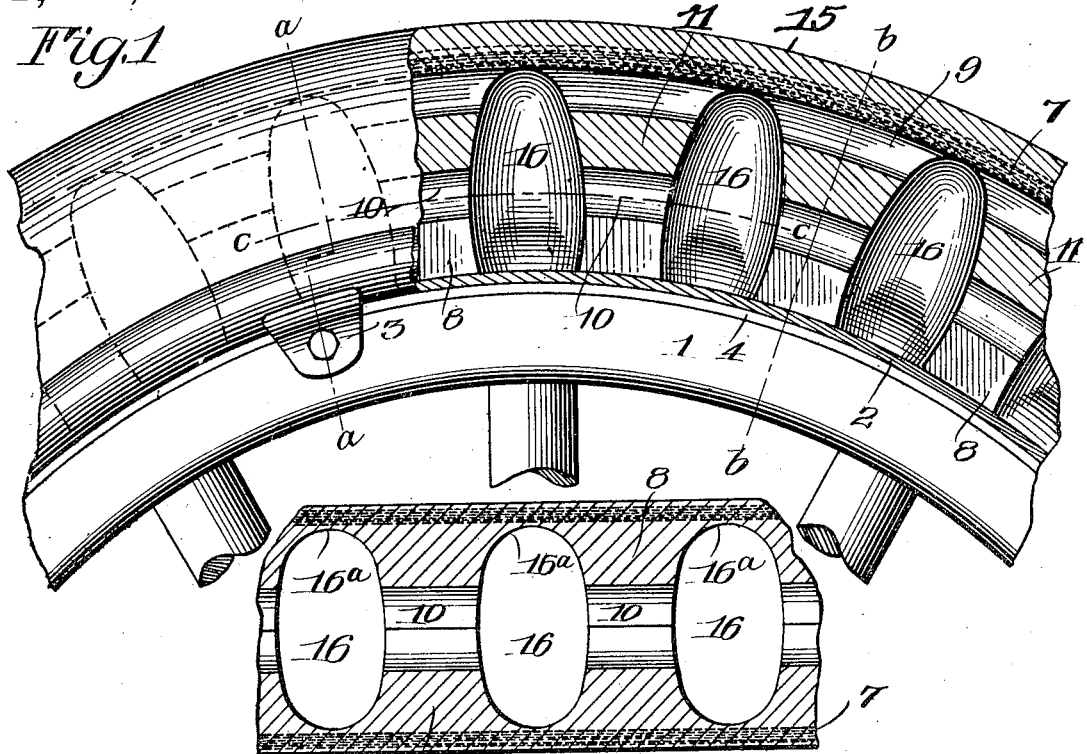
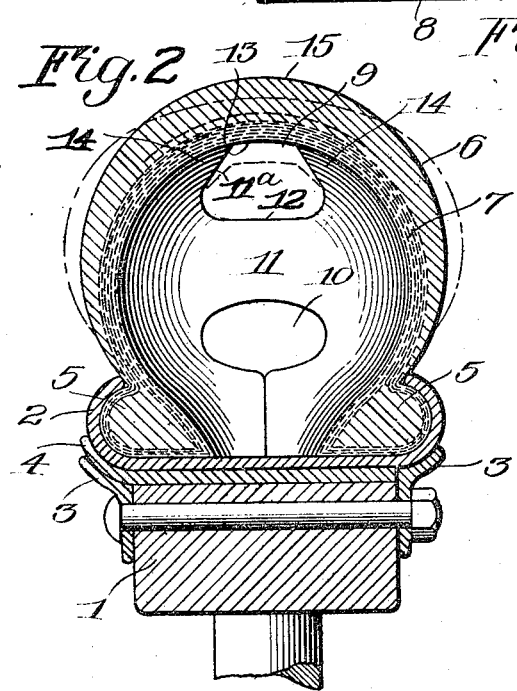
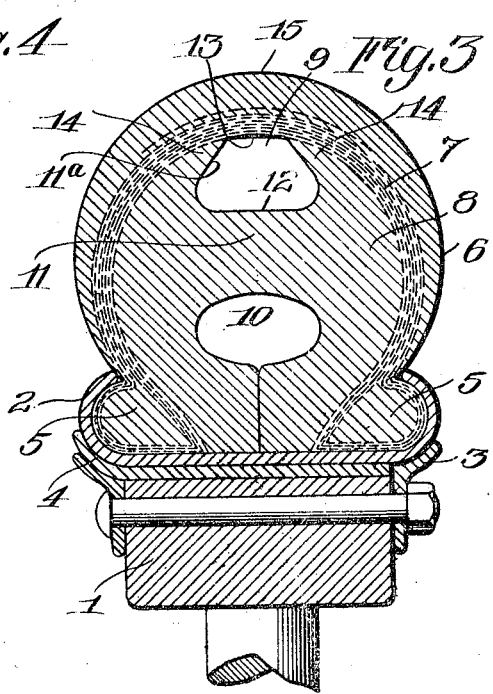

NATT SQUIER, OF CLIFTON SPRINGS, NEW YORK, ASSIGNOR OF ONE-HALF TO JOHN N. MEAD, OF ITHACA, NEW YORK.

TIRE.

1,217,232.  Specification of Letters Patent.  Patented Feb. 27, 1917.

Application filed December 20, 1915. Serial No. 67,698.

*To all whom it may concern:*

Be it known that I, NATT SQUIER, of Clifton Springs, in the county of Ontario and State of New York, have invented certain new and useful Improvements in Tires; and I do hereby declare the following to be a full, clear, and exact description of the same, reference being had to the accompanying drawings, forming a part of this specification, and to the reference numerals marked thereon.

This invention relates to tires and more particularly that type known as cushion tires which are adapted to be reinforced preferably at intervals with transverse inserts across the body within the walls of the tire casing. Heretofore in tires of this type, it has been found that after they have been in service but a comparatively short time, flat spots or ridges are formed upon the tread of the tire opposite the inserts or reinforcements, the outline of the reinforcements being clearly visible upon the outer face of the tread. This no doubt is due to the rigidity of the reinforcements, especially at the points where such reinforcements connect with the tire immediately under the outer or tread wall thereof. My invention has for an object to overcome this difficulty by providing yielding inserts or reinforcements which will support the tire at the sides thereof, so that the center of the tread is not directly reinforced or braced, thereby insuring a more elastic and serviceable tire.
A further object of the invention is to provide transverse reinforcements shaped in such a way as to maintain or hold the tire in true circular form under all service conditions, and at the same time to provide in a tire of this type, more resiliency and better results generally than have heretofore been obtained, especially in the increase in length of service and easy riding qualities of tires of this class. To these and other ends the invention consists in certain improvements and combinations of parts, all as will be hereinafter more fully described, the novel features being pointed out in the claim at the end of the specification.
In the drawings:

Figure 1 is a fragmentary elevation, partly in section, of a tire illustrating one embodiment of my invention;

Fig. 2 is a transverse sectional view taken on line *a—a* of Fig. 1;

Fig. 3 is a transverse sectional view taken on line *b—b* of Fig. 1, and

Fig. 4 is a sectional view taken on line *c—c* of Fig. 1.

Similar reference numerals in the several figures indicate the same parts.

Referring more particularly to the drawings, 1 represents a wheel felly to which is secured any suitable type of clencher rim 2 held by retaining members 3 and 4. The clencher rim 2 engages the lateral or interlocking flanges 5 of the tire 6. The tire may be reinforced with any suitable fabric material, as indicated at 7. Transverse reinforcing resilient members 8 are spaced preferably at intervals within and around the tire, as indicated in Fig. 1. The reinforcing members are provided with outer openings 9, and preferably centrally located inner openings 10 between which are yielding ties or bridge portions 11 connecting the sides of the reinforcing members. The opening 9 is preferably defined by the side walls 11$^a$ and by the inner and outer walls 12 and 13 respectively the latter forming the inner tread wall 13 of the tire. The side walls 11$^a$ are inclined toward each other, as shown in Figs. 2 and 3, and upon opposite sides thereof are formed the outwardly and inwardly extending resilient arms or supports 14 which when forced inwardly by the action of the tread 15, as indicated by dotted lines in Fig. 2, will serve to return or spring the tire tread back to normal position without causing ridges or flat spots to appear thereon, after the tire has been in service a short time, which would be the result if the inner face of the tread was directly reinforced at the center thereof. In the present instance the resilient spring like arms or supports 14 being thick at their base and tapering substantially to a point at their outer ends, will when compressed, move toward each other under considerable resistance and when the pressure is released the parts, due to the inherent resiliency of the material, will resume their original upright position. By this construction I am enabled to provide a cushion tire unsupported directly beneath the tread or contact portion throughout the entire circumference of the wheel, but at the same time having supporting members upon each side of the center of the tire sufficient to yieldingly support and return the tread to normal position under all service conditions. By means of the openings 9 a continuous channel or groove is formed around the inner circumference of the tread at the center thereof, whereby the forming of ridges or flat spots indicating the outline of the reinforcing members upon the outer face of the tread is obviated. It has been found that in the case of cushion tires wherein solid transverse reinforcing members are used that considerable trouble is experienced in the tire splitting along the outer surface adjacent the clencher rim, which has been due to the improper shaping and positioning of the central openings in the reinforcing members. In order to overcome this objection I have arranged or positioned the opening 10 substantially opposite the outer edge of the clencher rim, as shown in Figs. 2 and 3, and have provided preferably an elongated opening, as indicated at 10, the longer axis of which extends transversely of the tire. In this way, the stretching or tightening effect usually produced through the tire immediately above the clencher rim is overcome when pressure is applied at any given point of the tread, by reason of the fact that the space provided for taking care of the compressed material at this point is properly positioned and shaped to relieve the excessive strains usually set up in this portion of the tire. The spaces 16 between the reinforcing members are preferably oval or rounded both in vertical and transverse section, as indicated in Figs. 1 and 4 whereby the material forming said openings will be free from sharp corners which are very objectionable in rubber tire constructions, due to the splitting apart of the material where pressure is applied adjacent to surfaces meeting at sharp angles. Further the rounding of the edges of the openings provides an arch construction at the top or outer ends and at the sides the corner fillets 16ª serve to insure a uniformity in displacement of the material in the outer shoe under compression. The reinforcing members 8 are preferably formed integral with the tire body, but may be loosely positioned therein, if desired.

It will be obvious from the above that I do not wish to limit myself to the exact construction shown and that such changes and alterations may be made in the detailed construction of the parts, as fall within the scope of the appended claim.

I claim as my invention:

A flexible tire comprising a hollow body having a series of spaced reinforcing members therein extending transversely of the body and resilient arms carried upon the outer portions of the reinforcing members, said arms being thicker at their inner base portions than at their outer ends, the inner faces of the arms being inclined inwardly toward each other to a point beneath and adjacent the inner face of the tread wall of the tire whereby when the tread is compressed the extremities of the arms will yieldingly approach each other and serve to return the tread to normal position when the pressure thereon is released.

NATT SQUIER.

Witnesses:
G. WILLARD RICH,
RUSSELL B. GRIFFITH.